United States Patent [19]

Sato

[11] 3,970,068

[45] July 20, 1976

[54] HEAT EXCHANGE PACKAGE FOR FOOD

[76] Inventor: Shotaro Sato, No. 3, 1-chome, Nakatsu-Hamadori, Oyodo, Osaka, Osaka, Japan

[22] Filed: May 15, 1975

[21] Appl. No.: 577,580

Related U.S. Application Data

[63] Continuation of Ser. No. 453,897, March 22, 1974, abandoned.

[30] Foreign Application Priority Data

May 29, 1973   Japan.................................. 48-60499

[52] U.S. Cl............................................. 126/263; 62/4; 62/294; 206/219; 206/222; 426/109
[51] Int. Cl.².............................. F24J 1/00; B65B 25/22
[58] Field of Search............ 426/109, 111, 112, 115, 426/113, 124, 131, 398; 126/263; 62/294, 4; 206/219, 221, 222

[56] References Cited

UNITED STATES PATENTS

| 654,174 | 7/1900 | Murmann | 126/263 |
|---|---|---|---|
| 1,971,364 | 8/1934 | Zimmer et al. | 126/263 |
| 2,212,441 | 8/1940 | Katz | 126/263 |
| 2,300,793 | 11/1942 | Martin | 126/263 |
| 2,620,788 | 12/1952 | Rivoche et al. | 126/263 |
| 2,914,062 | 11/1959 | Del Raso | 126/263 |
| 3,213,932 | 10/1965 | Gottfurcht | 165/61 |
| 3,347,410 | 10/1967 | Schwartzman | 222/80 |
| 3,653,372 | 4/1972 | Douglas | 126/263 |
| 3,655,096 | 4/1972 | Easter | 222/82 |
| 3,675,637 | 7/1972 | Trimble | 126/263 |
| 3,715,189 | 2/1973 | Niglohoss | 23/259 |

FOREIGN PATENTS OR APPLICATIONS

| 158,259 | 10/1939 | Germany | |
| 356,576 | 10/1961 | Switzerland | 126/263 |

*Primary Examiner*—Steven L. Weinstein
*Attorney, Agent, or Firm*—George B. Qujevolk

[57] ABSTRACT

A foodstuff container capable of heating or cooling food or beverage contained therein having three compartments to accommodate food or beverage, an exothermal or endothermal reaction agent, and a reaction-inducing agent respectively, a needle member to open a way for the thermal reaction agent and the reaction-inducing agent to mix with so as to cause a thermal reaction for heating or cooling the contained food or beverage, and a bottom cover having at its center a plurality of pleats radiating therefrom, said pleats affording some elasticity and flexibility to said bottom cover, said bottom cover also projecting outward at its center so that said bottom cover can bounce back inwardly at the center upon pushing by a finger from the outside so that the bottom cover pushes the needle existing between the compartments accommodating the exothermal or endothermal reaction agent and the reaction-inducing agent respectively, so that the two agents mix to produce thermal reaction as the result.

2 Claims, 12 Drawing Figures

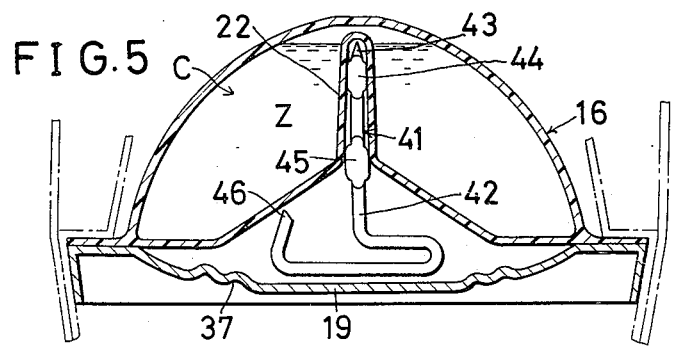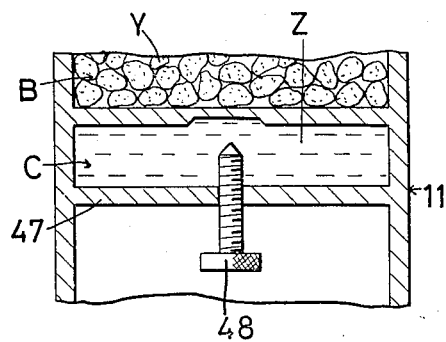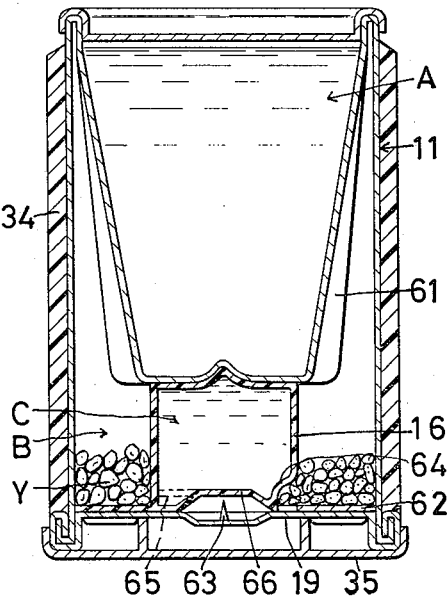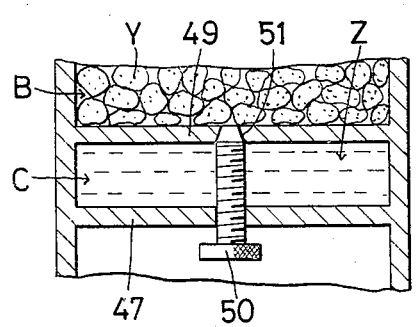

3,970,068

HEAT EXCHANGE PACKAGE FOR FOOD

This is a continuation of application Ser. No. 453,897 filed Mar. 22, 1974 now abandoned.

The present invention relates to a foodstuff container having means for mixing a thermal reaction agent either exothermal or endothermal with a reaction-inducing agent thereby causing a thermal change available for heating or cooling food or beverage contained therein.

Any beverages such as coffee, soup, Sake and the like or food such as noodles, curry, potage and the like is containable in the container in a compartment thereof, said compartment being separated from other compartments in said container wherein the mixing means and the chemical materials are accommodated separately, said food or drink being available heated or cooled even in a train, vessel, car, plane or in an alpine mountain in disregard of the atmospheric pressure, said heating temperature reaching as high as around 200°C to be ideal for heating foodstuff not to burn the food as in case of using cooking utensils in general.

A main purpose of the present invention is to provide food or beverages heated or cooled whenever and wherever desired without using any tool or device for heating or cooling.

A second object of the present invention is to simplify the construction of and operation of a container as described above so that the mixing of a thermal reaction agent with a reaction inducing agent may be conducted readily.

The above and other objects of the present invention will be accomplished by the improvement, combination and operation of every part constituting the present invention, preferred embodiment of which are illustrated in detail in relation with the annexed drawings as following:

FIG. 5 is a magnified longitudinal sectional view of said mixing means showing a second embodiment of piercing means.

FIG. 6 is a longitudinal sectional view of said mixing means showing a third embodiment of piercing means.

FIG. 7 is a longitudinal sectional view of said mixing means showing a fourth embodiment of piercing means.

FIG. 8 is a longitudinal elevation of the container in the present invention showing a second embodiment of piercing means.

Figure 1:
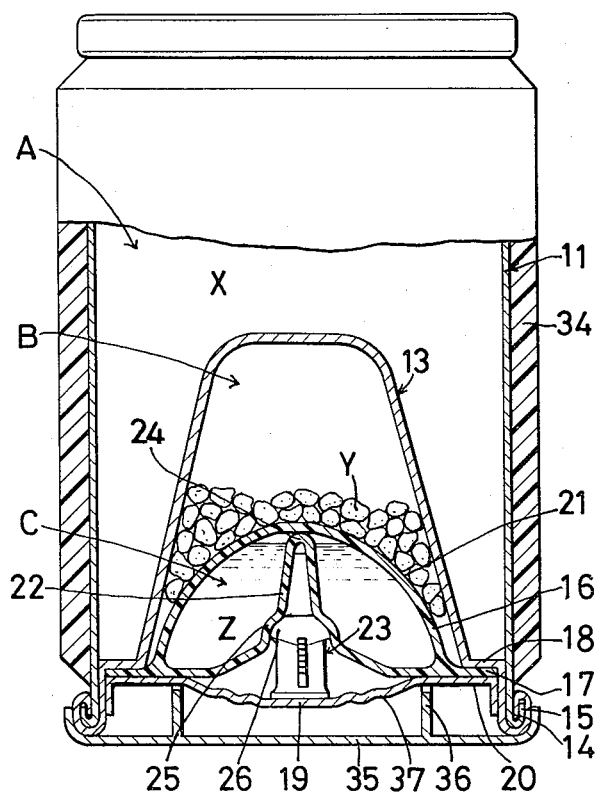
FIG. 1 is an elevational view of main parts of the container in the present invention showing a first embodiment.
Figure 4:
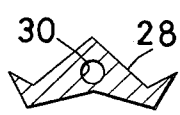
FIG. 4 is a sectional view along arrow-marked line IV-IV in FIG. 2.

In the first embodiment shown in FIGS. ranging from 1 to 4, numeral 11 designates the container proper made of metal or "alminium-coated paper" or synthetic resin, the container proper 11 being completely sealed as in case of usual food-containing cans or having a detachable cap covering the upper opening thereof.

Numeral 13 designates a hat-like partition dividing the container proper 11 into compartments A and B, and numeral 16 designates another partition forming compartment C within the compartment B, said partition 13 being made of heat-conductive material such as metal and the partition 16 made of synthetic resin and the like having the characteristic of easiness to break and flexibility in changing shape under the effect of heat.

Partition 13 is securely settled therein by means of having its lowermost periphery join the inside periphery of the container proper 11 at the lower terminal thereof, and the partition 16 is provided with a flange 17 which is firmly sandwiched between the flange 18 of the partition 13 at the underside surface thereof and the bottom cover 19 of the container proper 11 at the upper periphery 20 thereof. The bottom cover 19 is also securely attached to the container proper 11 by abutting to the inside surface of the partition 13 at the lowermost periphery 14 thereof. (Hereinunder, capital letters X, Y, and Z denote foodstuff; thermal reaction agent; and reaction-inducing agent, respectively.)

In the compartment A is contained X including beverages such as coffee, soup, Sake, beer and the like or foods such as noodle, curry, potage and the like, in the compartment B is accommodated Y including exothermal reaction agents such as caustic lime and the like or an endothermal reaction agent such as sodium nitrate and the like, and the material Z, with water as the one most effective and easiest to get, is contained in the compartment C.

The partition 16 comprises a spherical portion 21 and a cylindrical portion 22 projecting upward abutting to the inside surface of said spherical portion 21 as shown in FIG. 1, said cylindrical portion 22 playing the role of a container for a needle-member 23 which is provided for breaking through the partition 16, said needle-member being designed to pierce through the cylindrical portion 22 at the forward tip 24 thereof and further into the compartment B through the partition 16 at the spherical portion 21 by manually pushing the bottom cover 19 inward from outside the container proper. The bottom cover 19 has elasticity owing to a number of pleats 37 radiating therefrom at its center and also projects outward at its center so that the bottom cover 19 may be pressed back projectingly inward thereby pushing said needle-member 23 forward.

Said material Z, i.e. water, contained in the compartment C flows out therefrom into compartment B and mixes with said material Y therein, resulting in a thermal change for heating or cooling foodstuff contained in the compartment A.

Figure 2:
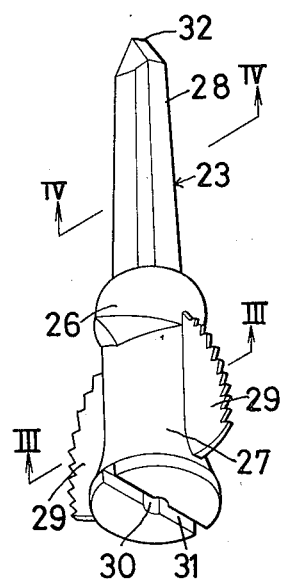
FIG. 2 is a magnified perspective view of a needle-member incorporated in a mixing means used in the first embodiment.

As shown in FIG. 2, the needle-member 23 is held stable in the cylindrical portion 22, said needle-member 23 fitting at a projection 26 thereof to a recess 25 formed inside the cylindrical member 22.

Figure 3:
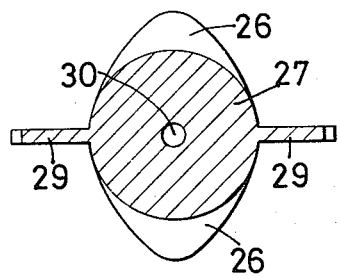
FIG. 3 is a sectional view along arrow-marked line III-III in FIG. 2.

Said needle-member 23, as shown in FIG. 2, comprises a base portion 27, an oval projection 26 and an upper portion 28 having a forward tip 32, said base portion 27 as shown in FIG. 3 being provided with two arc-shaped saws 29 projecting therefrom in opposite directions, said saws 29 cutting said cylindrical portion 22 axially at the lower portion thereof providing a longitudinal opening 31 for facilitating the outflow of water from the compartment C at the time of conducting the thermal reaction process.

The oval projection 26, shown in FIGS. 2 and 3, is located between upper portion 28 and base portion 27 of the needle-member 23, said oval projection 26 being inserted at its narrower ends into a recess 25 formed inside said cylindrical portion 22 at both sides thereof for the firm holding of said needle-member 23. The oval projection 26 also gets to deform said cylindrical portion 22 sectionally into an oval at the time of forward advance of said needle-member 23 thereby allowing said saws 29 to cut said cylindrical portion 22 at its narrower sides, said saws 29 joining said oval projection 26 at right angles to the longer diameter thereof, as shown in FIG. 2.

In FIG. 2, numeral 31 designates a groove and numeral 30 designates a ventilation hole formed on the needle-member 23 at the bottom thereof, said ventilation hole 30 penetrating axially through the needle-member 23 playing the role together with said groove 31 of facilitating the outflow of said material Z, i.e. water, into the compartment B at the time of the aforementioned thermal reaction operation.

Numeral 34 in FIG. 1 designates an adiabatic material such as foamed synthetic resin and the like covering said container proper 11.

Numeral 35 designates a safety cap detachably adapted to the container proper 11 at the bottom thereof, said safety cap 35 having ribs 36 therein preventing an accidental pushing of said bottom cover 19 inward.

In the embodiment illustrated in FIGS. ranging from 1 to 4, the thermal changing process in case of heating is described as following:

After removal of safety cap 35, said bottom cover 19 is pushed inward strongly by a finger and the like so that needle-member 23 is pushed forward by the inward-projecting bottom cover 19. The forward tip 32 of needle-member 23 pierces through the cylindrical portion 22 and the partition 16 into the compartment C, simultaneously said saws 29 axially cut inside of the cylindrical portion 22 to provide ventilation openings so that said material Z, i.e. water, flows out therefrom into the compartment B where it mixes with the material Y, i.e. caustic lime, for causing a heating reaction, the generated heat energy fills compartment A heating the content X contained in the compartment A by way of gradual heat exchange. The caustic lime swells in the process of said thermal reaction thereby filling in the compartment B to press upon the partition 16 which has become soft and deformable due to the heat effect, said reaction-inducing agent Z being squeezed out of the compartment C to the last of drop as the result, partition 16 finally lying flat on the bottom cover 19 acting as an adiabatic material preventing the heat energy from dispersing therewith. After completion of the exothermal reaction process, the heat energy is kept around 200°C therein for about 20 minutes.

Said material X can be cooled, of course, by means of accommodating an endothermal reaction agent in the compartment B as described hereinbefore, said material X including beer, juice, cider and any other drinks which are better consumed cooled than warm. Temperature in this case ranges from around 0°C to 4°C in the compartment B at the time of completion of the thermal reaction.

Other embodiments of the present invention distinctive from the first embodiment described above are illustrated in relation with FIG. 5 – 12. (Numerals in the drawings already mentioned heretofore will not be referred to in the following description unless necessary.)

In FIG. 5, numeral 41 designates a needle-member to be held in the cylindrical portion 22 of partition 16, said needle-member 41 being made of a single wire member which can bend, said needle-member 41 forming a forward tip 43 on a straight base portion 42 thereof, said base portion 42 having a flat part 44 for expanding the broken area of partition 16 and another flat part 45 for securely holding said needle-member 41 inside said cylindrical portion 22. The base portion 42 is bent at its lower terminal so that a second forward tip 46 may be formed so as to abut to the partition 16 at its underside portion, forward tip 46 breaking said partition 16 thereby providing a ventilation hole while the first forward tip 43 pierces through said cylindrical portion 22 and said partition 16 on the other side.

The way of manually operating said needle-member 41 is similar to that as in case of the first embodiment.

FIG. 6 illustrates a third embodiment with the use of a screw 48 for the mixing work described hereinbefore, said screw 48 spirally piercing through a partition 47 at the underside thereof thereby reaching the compartment C and dips in the material Z, i.e. water, at its forward portion before the mixing operation.

If needed screw 48 is turned directly by the hand until it pierces through the partition 47 at its tip and reaches the compartment B thereby allowing the material Z to flow out of the compartment C into the compartment B for the carrying out of the required mixing as in case of other embodiments hereinbefore described. Needless to say, the container is covered only with a detachable safety cap at the bottom similar to the cap in FIG. 1.

FIG. 7 illustrates the fourth embodiment and shows a screw 50 the forward tip 51 of which pierces through the underside partition 47 and further through the compartment C and the upper partition 49 until reaching the compartment B when the afore-mentioned mixing is yet to be conducted. Said screw 50 is pulled back at need, instead of pushing forward in case of the hitherto-described embodiments, thereby allowing the passage of the material Z into the compartment B so that material Z mixes with material Y as will be apparent in the drawing. In this case also the container is covered only with a detachable safety cap as in case of the FIG. 6 to permit the turning of the screw 50 directly by the hand.

Figure 9:
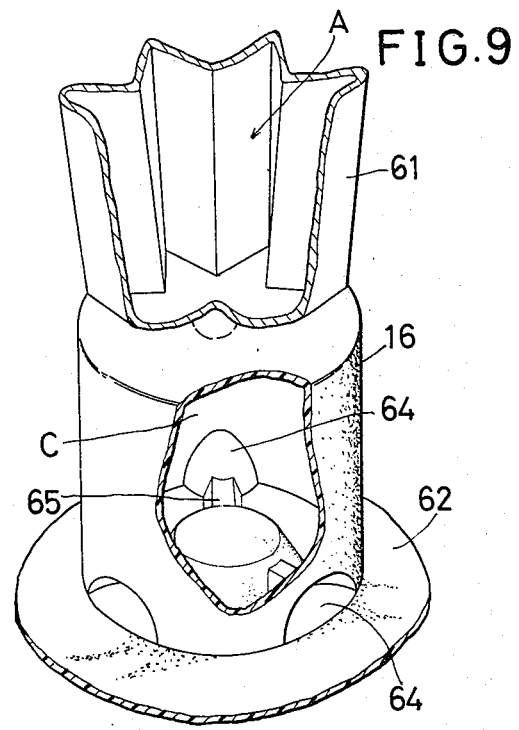
FIG. 9 is a perspective view of main parts of said container showing a second embodiment of piercing means.

In FIGS. 8 and 9 illustrating the second embodiment, numeral 61 designates a partition forming a compartment A for containing the content X, below said partition 61 are compartments B and C divided by another compartment 16 which has a plurality of recess 64 and recess groove 65 and is provided with a flange 62.

A needle-member 63 is located on the bottom cover 19 projecting upwards therefrom and is pushed as in the case of the first embodiment, breaking through the bottom portion 66 of partition 16 into the compartment C thereby causing the mixing operation as hereinbefore described. In this case, the recesses 64 and grooves 65 facilitate the flowing of the material Z into the compartment B.

Figure 10:
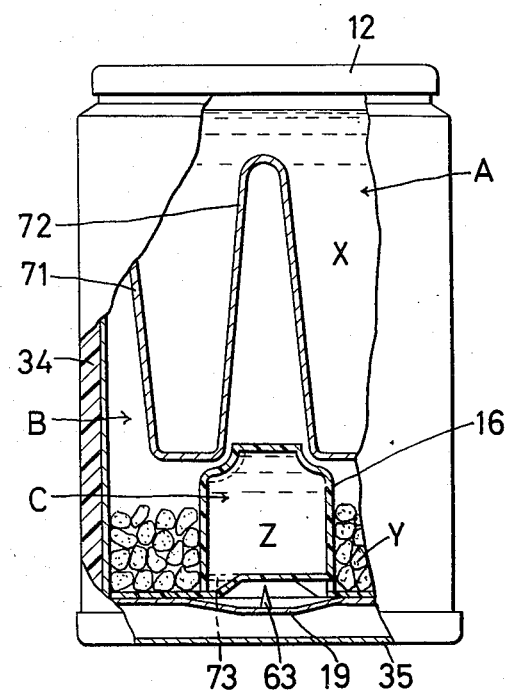
FIG. 10 is an elevation of main parts of said container showing a third embodiment of piercing means.

In FIG. 10 illustrating the third embodiment, the container proper is similar in construction to the container in FIG. 8 except for a partition 71, said partition 71 forming a projecting portion 72 for enlarging the area of heat exchange.

In this figure, numeral 73 designates a recess groove provided at the bottom of the compartment C, said recess groove 73 also playing the role of facilitating the flow of the material Z out of the compartment C into the compartment B.

Figure 11:
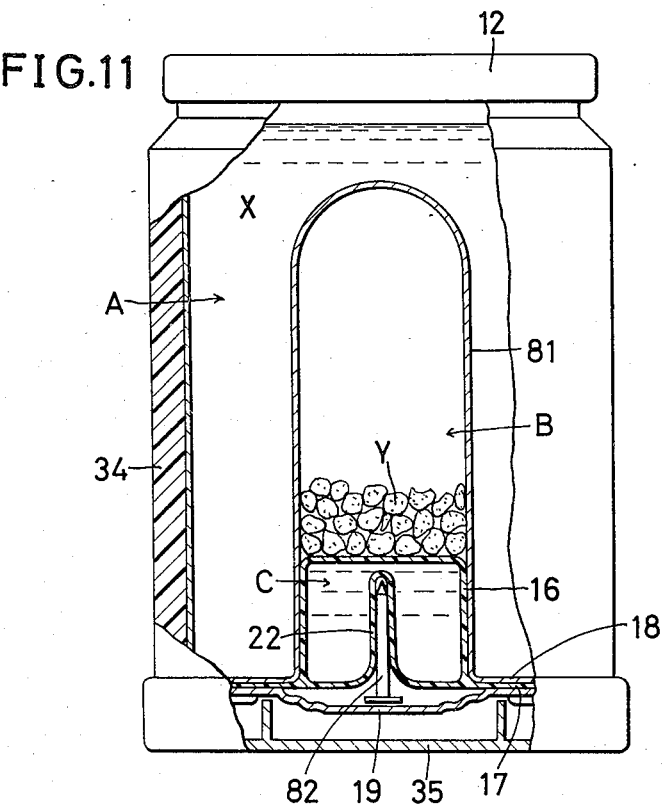
FIG. 11 is an elevation of main parts of said container showing a fourth embodiment of piercing means.

In FIG. 11 which illustrates the fourth embodiment, numeral 81 designates a partition dividing the inside space of the container proper into a compartment A and a compartment B for containing X and Y, respectively, said compartment B being partitioned by another partition 16 for providing another compartment C thereunder for accommodating the material Z. The partition 16 has a flange 17 which is sandwiched between a bottom cover 19 of the container proper at the periphery 20 thereof and the partition 81 at the flange portion 18 thereof the location of the partitions 16 and 81 being secured therewith as in case of FIG. 1.

A needle-member 82 is held in a cylindrical portion 22 also as in case of FIG. 1.

Figure 12:
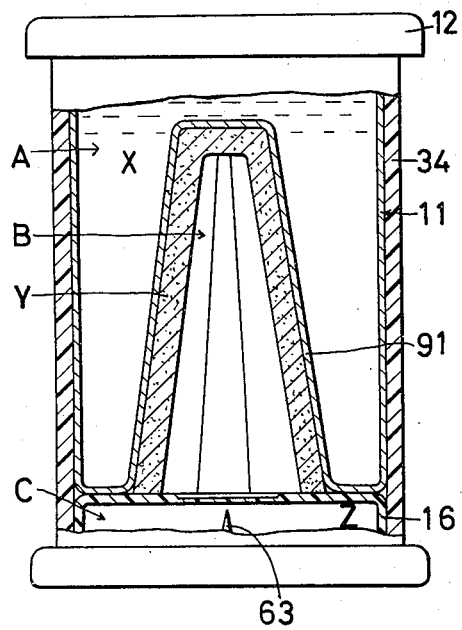
FIG. 12 is an elevation of main parts of said container showing a fifth embodiment of piercing means.

In FIG. 12 illustrating the fifth embodiment, numeral 91 designates a partition in the form of a projection standing on a partition 16, a thick layer of the material Y being inside the partition 91 thereby forming a space B which corresponds to compartment B in case of other embodiments. The material Z in the compartment C, which is formed beneath the partition 16, flows out into said space B thereby mixing with the layer of the material Y.

Common to all embodiments in the present invention, the compartment for containing foodstuff is sectionally rose-shaped for enchancing the heat-exchanging efficiency.

What is claimed is:

1. A foodstuff container comprising, in combination:
   a. an enclosed container housing having a bottom, a removable top, a first inner partition of one-piece construction comprising an essentially spherical top portion and a bottom portion provided with an upwardly projecting portion extending to adjacent said essentially spherical top portion, said upwardly projecting portion defining an essentially cylindrical container, a radial shoulder on said upwardly projecting portion defining a radial recess in said essentially cylindrical container, and a second inner partition of inverted U-shape disposed between said first inner partition and said removable top;
   b. a first closed compartment in said container housing defined by said essentially spherical top portion and said bottom portion of said first inner partition and containing therein a reaction-inducing agent, a second closed compartment in said container housing defined by said first and second inner partitions containing therein a reaction agent;
   c. a third closed compartment in said container housing defined by said removable top and said second inner partition for containing therein food or beverages, the mixing of said reaction-inducing agent and said reaction agent producing a thermal heating reaction; and
   d. manually operable piercing means comprising an elongated needle-member comprising an upper needle, a base portion having two arc-shaped saws projecting laterally outward on opposite sides therefrom and an oval projection portion connecting said upper needle to said base portion with said saws joining said oval projection portion at right angles to the axis of the elongated needle-member, said oval projection portion being positioned within said radial recess in said cylindrical container for firmly holding said needle-member in said cylindrical container and outside said first compartment, said elongated needle-member extending upwardly from said base portion adjacent said housing bottom to said upper needle within said cylindrical container thereby coupling said needle-member to said cylindrical container, said housing bottom being provided with pleats for imparting elasticity to said housing bottom and said first inner partition being easily breakable by said needle-member, said housing bottom being manually movable upwardly together with said needle-member to permit said upper needle to pierce said upwardly projecting portion and said spherical top portion of said first inner partition thereby producing a mixing of the two agents in said first and second compartments for producing a desired thermal reaction so as to heat the food or beverages in said third compartment.

2. A foodstuff container in accordance with claim 1 wherein said first inner partition is formed of a material which becomes soft and deformable under the influence of heat and wherein said first inner partition is deformed by the heat generated during said thermal reaction to squeeze essentially all of the reaction-inducing agent out of said first compartment.

* * * * *